United States Patent [19]

Greenwood et al.

[11] 3,981,824

[45] Sept. 21, 1976

[54] REGENERATION METHOD FOR GRAVITY-FLOWING CATALYST PARTICLES

[75] Inventors: Arthur R. Greenwood, Niles; Earl S. Lemberger, Buffalo Grove, both of Ill.

[73] Assignee: Universal Oil Products Company, Des Plaines, Ill.

[22] Filed: Nov. 13, 1974

[21] Appl. No.: 523,288

[52] U.S. Cl. .............................. 252/415; 23/288 B; 23/288 G; 208/140; 252/418
[51] Int. Cl.² .................... B01J 23/96; C10G 35/08
[58] Field of Search ............ 252/415, 418; 208/140; 23/288 B, 288 G

[56] References Cited
UNITED STATES PATENTS

| | | |
|---|---|---|
| 3,652,231 | 3/1972 | Greenwood et al. ............. 23/288 G |
| 3,706,536 | 12/1972 | Greenwood et al. ............. 23/288 G |
| 3,751,379 | 8/1973 | Hayes ................................. 252/415 |
| 3,753,926 | 8/1973 | Hayes ................................. 252/415 |

*Primary Examiner*—Winston A. Douglas
*Assistant Examiner*—P. E. Konopka
*Attorney, Agent, or Firm*—James R. Hoatson, Jr.; Robert W. Erickson; William H. Page, II

[57] ABSTRACT

A continuous method for regenerating deactivated catalyst particles in a regeneration zone through which the particles are downwardly movable via gravity-flow. Particles initially are introduced into a carbon-burning section, flow therefrom into a halogenation section and then into a drying section from which they are removed from the regeneration zone.

5 Claims, 1 Drawing Figure

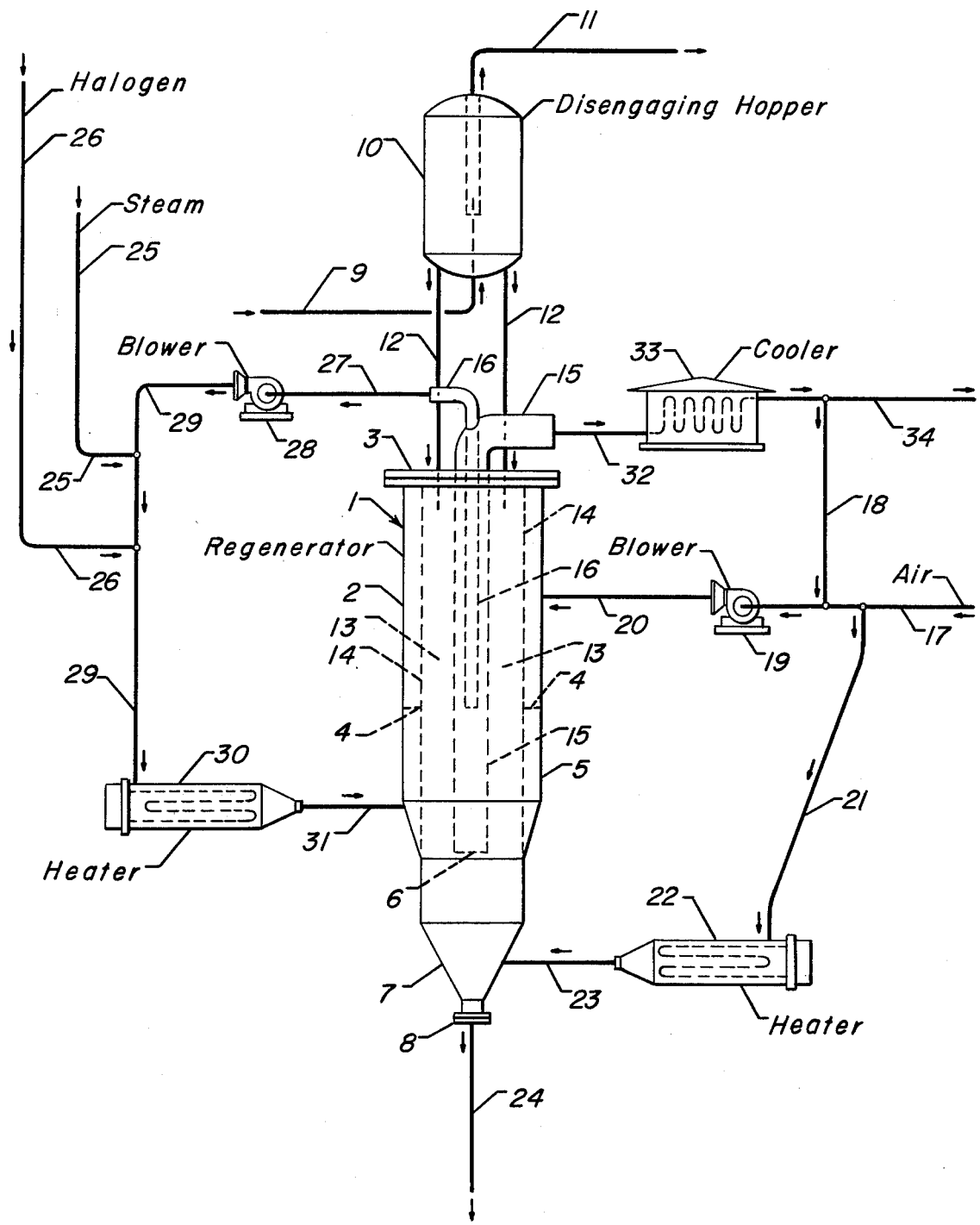

REGENERATION METHOD FOR GRAVITY-FLOWING CATALYST PARTICLES

APPLICABILITY OF INVENTION

Movable beds of particulate solids are currently employed in, or are applicable to a wide variety of systems. It is to such systems — i.e. those containing a bed of solids movable therethrough via gravity-flow — that the inventive concept of the present invention is applicable. More specifically, our invention is directed toward a system for the catalytic conversion of hydrocarbonaceous material, in which systems deactivated catalyst particles are regenerated in a zone, or chamber through which the particles are downwardly movable via gravity-flow.

Relatively recent developments within the petroleum industry have resulted in hydrocarbon conversion processes wherein the reactants contact one or more zones of catalyst particles downwardly movable therethrough via gravity-flow. This operating technique has been proposed for a wide variety of hydrocarbon conversion processes, including catalytic reforming, fixed-bed alkylation, hydrorefining, hydrocracking, dehydrogenation, hydrogenation, steam reforming, etc. Although the present catalyst regeneration technique is applicable to all the foregoing processes, in the interest of brevity the same will be further described in conjunction with the well-known catalytic reforming process. Historically, the catalytic reforming process has utilized a catalytic composite of a Group VIII noble metal component and a halogen component combined with a refractory inorganic oxide, and has been effected in a non-regenerative, fixed-bed system consisting of a plurality of reaction zones in side-by-side relation. When the catalytic composite is deactivated to the extent that continued operation is no longer economically feasible, the entire unit is shut down, and the catalyst regenerated in situ. After several such regenerations, the catalyst is replaced with fresh catalyst and the deactivated catalyst subjected either to an exotic reconditioning technique, or to an involved method for the recovery of the precious noble metal. Of more recent vintage is the so-called "swing-bed" system in which an extra reactor is substituted for one which is due to be placed off-stream for regeneration purposes.

Still more recently, a "stacked" reactor system has been provided in which the catalyst particles flow, via gravity, downwardly from one annular-form catalyst zone to another. Ultimately, the catalyst is transferred to a suitable regeneration system also functioning with a downwardly-moving bed of catalyst. In effect, the catalyst particles are maintained within the reaction system, and continuously transferred from one section to another in a manner such that the flow thereof is continuous, at frequent intervals, or at extended intervals, the movement thereof being controlled by the quantity of catalyst withdrawn from the last of the series of individual reaction zones.

U.S. Pat. No. 3,470,090 (Cl. 208-138) illustrates a side-by-side reaction system having intermediate heating of the reactant stream. Catalyst withdrawn from an individual reaction zone is transported to suitable regeneration facilities. This particular type of system can be modified such that the catalyst withdrawn from a given reaction zone is sent to the next succeeding reaction zone, while that catalyst withdrawn from the last reaction zone is transported to regeneration facilities. This latter technique is illustrated by U.S. Pat. Nos. 3,647,680 (Cl. 208-65) and 3,785,963 (Cl. 208-171). The catalytic reforming configuration is shown as a two-stage "stacked" system having an integrated regeneration facility which receives the catalyst particles withdrawn from the bottom reaction chamber. As illustrated, both techniques utilize a downwardly-moving bed of catalyst particles through the stacked zones and through the regeneration chamber.

U.S. Pat. No. 3,652,231 (Cl. 23-288G) describes a reconditioning, or regeneration system for a moving column of reforming catalyst. It is to this type of regeneration system that our invention is particularly directed, and affords a distinct improvement therein.

OBJECTS AND EMBODIMENTS

A principal object of our invention is to provide an improved method for continuously regenerating deactivated hydrocarbon conversion catalyst particles. A corollary objective involves a method for regenerating deactivated catalyst particles, comprising a Group VIII noble metal component and a halogen component in combination with a refractory inorganic oxide, in a regeneration zone through which said catalyst particles are movable via gravity-flow.

Another object of our invention is to afford a more economical technique for regenerating catalyst particles which have been deactivated by deposition of carbonaceous matter thereon and loss of halogen therefrom.

Therefore, in one embodiment, our invention is directed toward a method for continuously regenerating deactivated hydrocarbon conversion catalyst particles comprising A Group VIII noble metal component and a halogen component in combination with a refractory inorganic oxide, and which have been deactivated by deposition of carbonaceous matter thereon and loss of halogen therefrom, in a regeneration zone through which said catalyst particles are movable via gravity-flow, which regeneration method comprises the steps of: (a) introducing, (i) deactivated catalyst particles and (ii) a first air stream from an external source, into an upper carbon-burning section of said regeneration zone, and maintaining said catalyst particles in contact with said first air stream, within said carbon-burning section for a time sufficient to remove substantially all of said carbonaceous matter therefrom; (b) introducing (i) the catalyst particles from said upper carbon-burning section and (ii) steam and halogen, or a halogen-containing compound, into an intermediate halogenation section of said regeneration zone, and maintaining said catalyst particles in contact with said steam and halogen, or halogen-containing compound, within said halogenation section for a time sufficient to increase the halogen content of said catalyst particles; (c) introducing (i) the catalyst particles from said intermediate halogenation section and (ii) a second air stream from an external source, into a lower drying section of said regeneration zone, and maintaining said catalyst particles in contact with said second air stream, within said drying section, for a time sufficient to remove substantially all water therefrom; and, (d) withdrawing substantially water-free, regenerated catalyst particles from said regeneration zone.

In another embodiment, both the carbon-burning section and the halogenation section are maintained at temperatures in the range of about 750°F. to about 1050°F.

In a specific embodiment, the mole ratio of the air in said first stream to that in said second stream is at least 1.0:1.0.

Other objects and embodiments of our invention will become evident from the following more detailed description thereof.

SUMMARY OF INVENTION

As hereinbefore set forth, our invention is intended to effect the regeneration of deactivated hydrocarbon conversion catalyst particles comprising a Group VIII noble metal component and halogen component combined with a refractory inorganic oxide. In accordance with the Periodic Table of the Elements, E. H. Sargent & Co., 1964, the term "Group VIII noble metal component" is intended to include ruthenium, rhodium, palladium, osmium, iridium, platinum, and mixtures thereof. Furthermore, our regeneration method is applicable to the recently-developed bi-, tri- and tetra-metallic catalyst in which metallic components other than those of the Group VIII noble metals are incorporated therewith. Such other metallic components include technetium, rhenium, vanadium, cobalt, nickel, gold, germanium, tin, lead, bismuth, etc. Generally, the quantity of the Group VIII noble metal components within the final catalytic composite is small compared to the quantities of the other components combined therewith, and will be present in an amount of about 0.01% to about 2.0% by weight of the final catalytic composite, calculated on an elemental basis. Similarly, with respect to the multi-metallic catalysts, the other metallic components, hereinabove set forth will be present in an amount in the range of about 0.01% to about 5.0%, again calculated on an elemental basis.

Another ingredient of the type of catalytic composites regenerated by the present method is a halogen component. Although the precise form of the chemistry of the association of this component with the other components of the catalyst is not known with accuracy, it is customary in the art to refer thereto as combined halogen. This may be either fluorine, chlorine, iodine, bromine, or mixtures thereof, with fluorine and particularly chlorine being preferred. The halogen component will be present within the catalyst in an amount within the range of about 0.1% to about 5.0%, and generally from about 0.5% to about 1.5% by weight, calculated on an elemental basis. One or more of the foregoing metallic components and the halogen component is combined with a suitable refractory inorganic oxide carrier material. With respect to the latter, many compositions have been employed, including alumina, silica, zirconia, hafnia, boria, thoria, mixtures thereof, etc.; however, with respect to the catalytic reforming of hydrocarbons, alumina in and of itself, is generally preferred.

The foregoing is presented to describe the general type of hydrocarbon conversion catalyst particles to which the regeneration method of the present invention is particularly directed. It is understood that the precise chemical and/or physical make-up of the catalytic composite is not essential to the present invention, nor is the particular technique selected for the manufacture of the catalyst particles. In short, our invention is concerned solely with a method for continuously regenerating deactivated hydrocarbon conversion catalyst particles comprising a Group VIII noble metal component and a halogen component in combination with a refractory inorganic oxide. Further, our method is intended for utilization in those hydrocarbon conversion systems wherein catalyst particles are regenerated in a regeneration zone through which they are movable via gravity-flow.

It is generally conceded, by those possessing the requisite skill in the appropriate art, that the principal cause of observed deactivation or instability of catalytic composites employed in hydrocarbon conversion processes is associated with the formation of coke or carbonaceous matter on the surface of the catalyst. The conditions utilized in these hydrocarbon conversion processes, to effect the desired reactions, typically result in the formation of heavy, black carbonaceous matter which deposits on the surface of the catalyst and gradually reduces its activity by shielding its active sites from the reactants. With many hydrocarbon conversion catalysts, removal of the carbonaceous matter by burning in air, via one or more suitable techniques, generally suffices to reactivate the catalyst to an acceptable degree. However, when considering dual-function catalysts, or those containing a Group VIII noble metal component and a halogen component, carbon removal in and of itself does not result in an acceptable reactivated catalyst. These catalysts, and their capability to function as intended, are acutely sensitive to the loss of the combined halogen both during the processing of the selected hydrocarbon stream and the carbon-burning technique. Therefore, any successful regeneration procedure must recognize the attendant difficulty of restoring a uniform distribution of the halogen component within the catalyst particles. Furthermore, a comparison of fresh catalyst with deactivated catalyst indicates a substantial change in the character of the Group VIII noble metal component associated therewith. Generally, such a comparison indicates that the noble metal component, for example platinum, is no longer thoroughly and uniformly dispersed throughout the catalyst particles. These difficulties become more pronounced in situations involving the bi-, tri- and tetra-metallic catalytic composites. As exemplified by U.S. Pat. No. 3,751,379 (Cl. 252-415) these problems appear to have been successfully solved with respect to batch reconditioning, or in situ regeneration of a fixed-bed of catalytic particles.

With the advent of continuous hydrocarbon processing, utilizing catalyst particles movable through the various reaction zones via gravity-flow, and having an integrated regeneration facility through which the catalyst particles also flow via gravity, the specter surrounding reconditioning problems is once again in evidence. While it may be that the catalyst particles which the regenerator "sees" initially have a lesser quantity of carbonaceous matter to be removed, and a lesser quantity of halogen to be replaced, the mere fact that the particles are continuously in motion through some part of the regeneration zone necessitates judiciously selected techniques in order to provide a continous reconditioning method resulting in catalyst particles suitable for re-utilization in the reaction zone, or zones. One suitable technique is that proposed for use with the reconditioning system illustrated in U.S. Pat. No. 3,652,231 (Cl. 23-288G). The regeneration zone is shown as having an upper carbon-burning section, an intermediate halogenation section and a lower drying section. Catalyst particles are introduced initially into the top of the regeneration zone, pass downwardly through the carbon-burning section into the halogenation section and finally into the lower drying section.

All the air required for reconditioning is introduced into the lower drying section and passes upwardly therefrom into the halogenation section, and therethrough into the carbon-burning section. Halogen and steam are introduced into the intermediate halogenation section, and any excess is recycled in admixture with fresh steam and halogen. Furthermore, combustion vapors from the carbon-burning section are introduced into a caustic scrubbing facility, and thereafter recycled to the carbon-burning section.

Our catalyst regeneration method is intended to improve significantly the above-described technique, in which no halogenation is effected in the carbon-burning zone as a result of halogen, or halogen-containing compound being removed from the recycled flue gas in the caustic scrubbing facility. Actually, the foregoing technique effectively strips halogen from the incoming deactivated catalyst, thus increasing the burden placed upon the subsequent halogenation section. Furthermore, since all the air from the external source is introduced into the lower section, excessive quantities of halogen are effectively swept out of the halogenation section into the carbon-burning zone where they are removed by the caustic scrubbing facility, thus increasing the consumption of halogen.

In accordance with out inventive concept, air from a suitable external source is introduced into both the lower drying section and the upper carbon-burning section. The mole ratio of air introduced into the carbon-burning section, to that introduced into the drying section is at least 1.0:1.0, and generally in the range of about 1.0:1.0 to about 9.0:1.0. Preferably, the quantity (or proportion) of air introduced into the drying section will be the minimum sufficient to accomplish the necessary drying. Furthermore, the flue gas from the carbon-burning section is recycled without any intermediate treatment, excepting the cooling thereof. As a result, the quantity of fresh halogen, or halogen-containing compound required to effect suitable reconditioning is reduced as much as 50.0%, and only a very minor quantity of halogen is ultimately removed, or vented, from the system.

As previously stated, the halogenation section serves two principal functions: first, the halogen content of the catalyst particles must be increased and, secondly, the metallic components must be properly dispersed. Both functions are dependent to a great extent on the effective partial pressure of halogen in the halogenation section. One consequence of introducing 10.0% to 50.0% of the required air into the lower section, is maintaining the necessary halogen partial pressure with less fresh halogen addition. Upon comparing the present method and the prior art method, with respect to the halogen content of the catalyst particles, as they traverse the regeneration zone, it is noted that the burden placed on the halogenation section is significantly lessened. Assuming a fresh catalyst containing 1.0% by weight of combined chloride, which is reduced to 0.90% when the catalyst is considered deactivated, the technique heretofore practiced results in a further reduction to about 0.20% in the carbon-burning section. This must be increased to about 1.10% in the halogenation section in order that the halogen content of the dried catalyst is 1.0%. In accordance with the present technique, the halogen content of the catalyst leaving the carbon-burning section is 0.98%, which is increased to 1.1% in the halogenation section.

In further describing our invention, reference will be made to the accompanying diagrammatic sketch. This is presented for the sole purpose of illustration, and not with the intent of limiting our inventive concept beyond the scope and spirit of the appended claims. Miscellaneous appurtanances, not required for a clear understanding have been eliminated.

DESCRIPTION OF DRAWING

With reference now to the drawing, there is illustrated a regeneration zone 1, having an upper carbon-burning section 2, an intermediate halogenation section 5 and a lower drying section 7. Although the various structural elements may take any suitable tubular form, sound engineering techniques dictate that the same be substantially circular in cross-section. Catalyst particles which have been withdrawn from a lower reaction zone, through which they are movable via gravity-flow, are transported to the regeneration zone 1 via lift line 9, being introduced thereby into a disengaging hopper 10. The latter serves to disengage the catalyst particles from powdery catalyst fines which are removed from the regeneration facility by way of conduit 11. The catalyst particles flow downwardly through a pluralilty of inlet conduits 12, generally numbering from about four to sixteen, and into annular-form space 13. The latter is formed by perforated screen members 14 and 15, through which the reconditioning vapors pass.

The catalyst particles, at a temperature of about 200°F., initially traverse carbon-burning section 2 which is at a temperature of about 835°F. Carbon-burning section 2 is that portion of the regenerating chamber from top plate 3 to horizontally-disposed baffle 4. The catalyst particles flow via gravity into and through halogenation section 5, being that portion of the entire regeneration zone below baffle 4 and the terminal end 6 of centerpipe 15. The halogenation section functions at a temperature approximating 930°F. Drying section 7, from terminal end 6 to bottom plate 8 is at a temperature of from 830°F. to about 1000°F. That is, the air introduced by way of conduit 23 is at a temperature of about 1000°F., while the temperature of the catalyst particles emanating from the regeneration zone, via line 24, is about 830°F. The dried reconditioned catalyst particles are generally subjected to hydrogen reduction either in a separate vessel prior to being transported to the reaction zone, or in a vessel which is an integral part of the reaction zone.

At least a portion of the effluent vapors, flue gas, emanating from the carbon-burning section of the regeneration zone, are recycled thereto. Through this technique, the oxygen concentration within the carbon-burning section is regulated and maintained in the range of about 0.6% to about 1.5%. Furthermore, dilution of the halogen-steam atmosphere within the halogenation section is effected by the vapors emanating from the drying section. This relatively severe oxidizing atmosphere facilitates the redistribution of the noble metal component.

The remainder of the drawing will be described in conjunction with a commercially-scaled regeneration zone designed to process about 745.82 lbs./hr. of deactivated catalyst particles containing about 0.9% by weight of combined chloride and about 5.2% by weight of carbonaceous matter (coke). About 17.24 moles/hr. of air from a suitable external source, are introduced by way of line 17. Approximately 50.0% is diverted through line 21 into an electric heater 22. The temperature thereof is increased to about 1000°F., and the heated air is introduced into drying section 7 via line 23. About 0.35 moles/hr. of water are removed from the catalyst particles in the drying section.

A mixture of steam and halogen, or a halogen containing compound is introduced into halogenation section 5 by way of line 31, at a temperature of about 950°F. The halogen, for example chlorine, may be employed in its elemental state, or as a compound such as hydrogen chloride, propylene dichloride, tertiary butyl chloride, etc. In the present illustration, the halogen addition will take the form of hydrogen chloride. The greater proportion of effluent vapors from the halogenation section, about 587 moles/hr., will be withdrawn through imperforate conduit 16 and line 27 by blower 28 for recycle to the halogenation section via line 29. Steam, in the amount of about 0.46 moles/hr. is added by way of line 25, and about 0.19 moles/hr. of hydrogen chloride by way of line 26. The mixture continues through line 29 into electric heater 30 wherein the temperature is increased to a level of about 950°F.

A portion of the effluent vapors from the halogenation section, about 9.77 moles/hr., will by-pass conduit 16 and enter the carbon-burning section 2. Effluent gases from section 2, at a temperature of about 930°F., are withdrawn via conduit 15 and line 32, and introduced into cooler 33, wherein the temperature is lowered to about 845°F. The cooled vapors are withdrawn via line 34, and about 588.32 moles/hr. diverted via line 18; the remaining 18.37 moles/hr. continue through line 34, and are vented thereby. Air, in the amount of about 8.62 moles/hr., is admixed with the effluent vapors in line 18, the mixture being introduced into the carbon-burning section 2 by way of blower 19 and line 20.

The catalyst particles introduced into the regeneration zone from disengaging hopper 10, contain about 38.9 pounds per hour of coke and about 0.90% by weight of combined chloride. When these leave the carbon-burning section, and are introduced into the halogenation section, they are substantially coke-free, and the halogen content has been increased to about 0.98% by weight as a result of halogen entering with the net gas from the halogenation section. In the latter, the halogen content is increased to 1.1% by weight, and the catalyst particles contain about 0.90% by weight of water. The latter is removed in the drying section, and the dried catalyst particles are withdrawn from the regeneration zone containing 1.0% by weight of halogen. The upper carbon-burning section, the intermediate halogenation section and the lower drying section, of the regeneration zone, are sized and designed to provide an effective residence time, of the catalyst particles passing through each section, of from one to about three hours.

The foregoing illustrates the regeneration technique of the present invention wherein the air required from the external source is introduced into both the drying section and the carbon-burning section, and the recycle gas caustic scrubber has been eliminated. If the total air (17.24 moles/hr.), as in the prior art, had been introduced into the drying zone, approximately twice the fresh halogen would be required to achieve the desired result. Furthermore, the heater employed to raise the temperature of the air to the drying section would have to be sized to provide about twice the heater duty (BTU/lb.). These, as well as other benefits and advantages will become apparent to those possessing the requisite skill in the art.

We claim as our invention:

1. A method for continuously regenerating deactivated hydrocarbon conversion catalyst particles comprising a Group VIII noble metal component and a halogen component in combination with a refractory inorganic oxide, and which particles have been deactivated by deposition of carbonaceous matter thereon and loss of halogen therefrom, said method comprising the steps of:
   a. passing said catalyst particles downwardly by gravity flow through a vertically positioned confined regeneration zone maintained at a temperature of from about 750°F. to about 1050°F. and having an interconnecting upper carbon-burning section, with an intermediate halogenation section in interconnection with a lower drying section in descending sectional order;
   b. introducing said deactivated hydrogen conversion catalyst particles to said carbon-burning section and a first air stream from an external source through a carbon-burning inlet port to said carbon-burning section;
   c. burning substantially all of the carbonaceous matter from the catalyst particles in said carbon-burning section;
   d. withdrawing the excess air and combustion products from said carbon-burning section through a carbon-burning withdrawal port and cooling at least a portion thereof;
   e. recycling at least a portion of said cooled excess air and combustion products to said carbon-burning section through said carbon-burning inlet port;
   f. introducing the catalyst particles in the carbon-burning section to said interconnecting intermediate halogenation section;
   g. introducing steam and halogen or a halogen-containing compound to said intermediate halogenation section through a halogen-steam inlet port and therein increasing the halogen content of the catalyst particles;
   h. introducing the catalyst particles of increased halogen content to said interconnecting lower drying section;
   i. introducing a second air steam from an external source to said lower drying section through a lower drying section inlet port, wherein substantially all the water from said catalyst particles of increased halogen content in said lower drying section is removed, and wherein the mole ratio of air in said first air stream of (b) and said second air stream is at least 1.0:1.0;
   j. withdrawing the substantially water-free regenerated catalyst particles from the lower end of the regeneration zone through a catalyst particle withdrawal conduit; and,
   k. wherein in said method of regenerating said first air stream, second air stream and steam and halogen or halogen-containing compound are introduced transversely and flow countercurrently to said gravitational flow of said catalyst particles, and wherein air from the lower drying section passes upwardly therefrom into the halogenation section and therethrough into the carbon burning section.

2. The method of claim 1 further characterized in that the mole ratio of the air in said first air stream to that in said second air stream is in the range of from about 1.0:1.0 to about 9.0:1.0.

3. The method of claim 1 further characterized in that said burning section is maintained at a temperature of about 835°F.

4. The method of claim 1 further characterized in that said intermediate halogenation section is maintained at a temperature of about 930° F.

5. The method of claim 1 further characterized in that said lower drying section is maintained at a temperature of from about 830° F. to about 1000° F.

* * * * *